(12) United States Patent
Altman et al.

(10) Patent No.: US 9,183,387 B1
(45) Date of Patent: Nov. 10, 2015

(54) SYSTEMS AND METHODS FOR DETECTING ONLINE ATTACKS

(71) Applicant: GOOGLE INC., Mountain View, CA (US)

(72) Inventors: Alon Altman, Mountain View, CA (US); Alessandro Epasto, Rome (IT)

(73) Assignee: GOOGLE INC., Mountain View, CA (US)

(*) Notice: Subject to any disclaimer, the term of this patent is extended or adjusted under 35 U.S.C. 154(b) by 76 days.

(21) Appl. No.: 13/911,011

(22) Filed: Jun. 5, 2013

(51) Int. Cl.
*G06F 21/56* (2013.01)
*G06F 21/55* (2013.01)
*H04L 29/06* (2006.01)

(52) U.S. Cl.
CPC .............. *G06F 21/554* (2013.01); *G06F 21/56* (2013.01); *H04L 63/1416* (2013.01); *H04L 63/1425* (2013.01)

(58) Field of Classification Search
CPC ...................................................... G06F 21/56
USPC ........................................................... 726/23
See application file for complete search history.

(56) References Cited

U.S. PATENT DOCUMENTS

| | | | |
|---|---|---|---|
| 2010/0095374 A1* | 4/2010 | Gillum et al. | 726/22 |
| 2011/0055132 A1* | 3/2011 | Mahdian et al. | 706/46 |
| 2011/0234594 A1* | 9/2011 | Charles et al. | 345/440 |
| 2012/0246720 A1* | 9/2012 | Xie et al. | 726/22 |
| 2012/0266081 A1* | 10/2012 | Kao | 715/751 |
| 2014/0317736 A1* | 10/2014 | Cao et al. | 726/23 |

OTHER PUBLICATIONS

Berger-Wolf et al., "A Framework for Analysis of Dynamic Social Networks", 2006, pp. 523-528.*
Moh et al., "Can You Judge a Man by His Friends?—Enhancing Spammer Detection on the Twitter Microblogging Platform Using Friends and Followers", 2010, pp. 210-220.*

* cited by examiner

*Primary Examiner* — David Pearson
*Assistant Examiner* — Thaddeus Plecha
(74) *Attorney, Agent, or Firm* — Procopio, Cory, Hargreaves & Savitch LLP

(57) ABSTRACT

Detecting online attacks is described, including identifying one or more events associated with users on a social graph. For each type of event of the one or more events, generating at least one directed acyclic graph (DAG), where each node on the DAG represents a node on the social graph where an event of the type occurs and each edge on the DAG represents a propagation of the event from a first node of the edge to a second node of the edge.

18 Claims, 11 Drawing Sheets

SYSTEMS AND METHODS FOR DETECTING ONLINE ATTACKS

BACKGROUND

Online users often encounter unsolicited, unwelcomed, phishing, spoofing, and/or deceiving messages (collectively referred to as malicious messages or malicious information). To detect and mitigate malicious messages, some data processing networks rely on the online users to report malicious messages. However, not all malicious messages are reported, and some reports are false positive (e.g., reporting messages that are not malicious).

Some data processing networks employ automated (e.g., not relying on user reporting) techniques to detect and mitigate malicious messages. However, on a social network, perpetrators of malicious information may exploit the social connections of online users to avoid detection. For example, these sophisticated malicious information perpetrators may create many fake accounts (e.g., sybil accounts) and establish social connections with the sybil accounts.

To further disguise the sybil accounts to avoid detection, fake positive feedback may be associated with the sybil accounts (e.g., initiating and/or receiving "likes," "+1," comments, reposts, re-shares, etc.) to inflate the reputation and/or standing of these accounts on a network. Sybil accounts with a high reputation are used to spread malicious messages undetected and carry out online attacks.

SUMMARY

The subject matter described herein relates generally to data processing networks and, more particularly, to detecting online attacks.

The subject matter described herein may provide various advantages, such as reducing unproductive use of resources in addressing false positive attacks, taking advantage of social graphs or the like to better detect attacks, and providing better user experience with a higher accuracy in detecting and mitigating attacks.

The subject matter includes a method for detecting online attacks, including identifying one or more events associated with users on a social graph. For each type of event of the one or more events, generating at least one directed acyclic graph (DAG), where each node on the DAG represents a node on the social graph where an event of the type occurs and each edge on the DAG represents a propagation of the event from a first node of the edge to a second node of the edge.

In some implementations, the propagation of the event from the first node of the edge to the second node of the edge is based on the event occurs at a time T1 at the first node, the event occurs at a time T2 at the second node, and T1 is earlier than T2.

In some implementations, the propagation of the event from the first node of the edge to the second node of the edge comprises propagation of a first event occurs at the first node to a second event occurs at the second node, and content of the first event is related to content of the second event.

In some implementations, the event may be a posting of information on a social network.

In some implementations, the method may include determining a cluster of the at least one DAG; and determining a score associated with the cluster.

In some implementations, the score is based on a size of the cluster, which is a sum of a number of nodes of the at least one DAG.

In addition to a method as described above, the implementations may include a device, a system, and/or a computer-readable medium, but are not limited thereto.

DETAILED DESCRIPTION

The subject matter described herein is taught by way of example implementations. Various details have been omitted for the sake of clarity and to avoid obscuring the subject matter. The examples shown below are directed to structures and functions for implementing and detecting online attacks.

Figure 1:
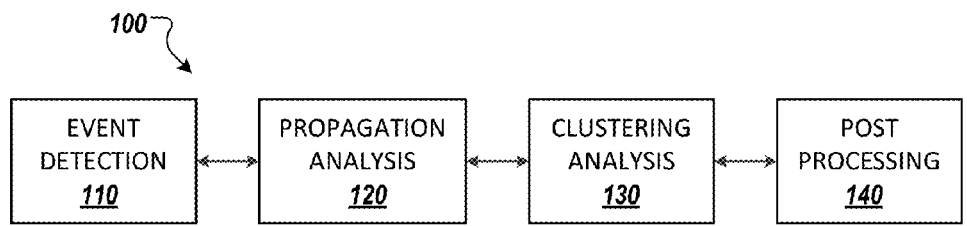
FIG. 1 shows an example processing pipeline for some implementations.

FIG. 1 shows an example processing pipeline 100 for some implementations. Pipeline 100 includes four stages labeled as event detection 110, propagation analysis 120, clustering analysis 130, and post processing 140. Pipeline 100 may include other stages that are not shown, such as input stage and output stage. The stages are conceptual stages. In implementations, two or more stages may be combined in a unit or module, such as combining an input stage with an event detection 110 stage or combining an event detection 110 stage with a propagation analysis 120 stage.

One or more of the stages 110-140 may be executed in parallel. For example, the event detection 110 stage may be detecting events parallel (e.g., detecting multiple events associated with one or more users and/or social graph at the same time). A latter stage (e.g., stage 12-, 130, or 140) may be executed in parallel (e.g., stage 120 performs the propagation analysis in parallel, stage 130 performs the clustering analysis in parallel, and/or stage 140 performs the post processing in parallel).

One or more of the stages 110-140 may be executed concurrently. For example, stage 100 may provide sets of events to stage 120 for propagation analysis. After stage 110 provides the first sets of event to stage 120, stages 110 and 120 may be executed concurrently (e.g., while stage 110 is detecting a second set of event, stage 120 is concurrently analyze the first sets of events).

At the event detection 110 stage, one or more signs of an attack (e.g., events) may be received, identified, reported, or detected. For example, one user may report abuse, spam, or malicious message (an event). The event may show or be traced to another user (attacker). A system may be running an attack detection process, which may detect or identify one or more attacking events. The attack detection process may use any one or more techniques to detect, identify, or determine attacking events (e.g., determining that an event, which is in the form of an email, is sent from an unknown source or an altered or fake address, identity, source, etc.). Detection techniques include but are not limited to the following three examples.

(1) Production of reported or abusive material: In this case, an attack event may be the production or reproduction of content (e.g., profile, post, photo or comment) by a user that has been reported as abusive by at least another user or that has been classified as abusive (e.g., by an automatic or semi-automatic system).

(2) Propagation of a specific content: In this context, a message (e.g., a post or comment) produced by a user is considered as an event. The actual content of the message (e.g., after a textual preprocessing) defines the type of the event. Variations of this technique may include the consideration of only messages that match specific keywords or patterns with the content in an original post (e.g., to detect that a message or post is not re-shared but is reproduced verbatim).

(3) Decrease in the user reputation score: In this case, an event is detected when a user reputation score drops below a certain threshold. Variations of this technique may consider the maximum variation of the scores in one day and the direction of the variation (increase or decrease).

In some implementations, a score can be computed or determined based on one or more aspects of users, nodes, and/or graphs. For example, a number of attack events found on one graph or cluster of graphs may be compared to the number of attack events found on another graph or cluster of graphs. Other example aspects include user profiles, usage history, frequency of usage (e.g., posting, messaging, etc.), concentration of events of certain types, etc.

After one or more events are detected at the event detection 110 stage, to determine or increase the confidence level that the events are attack events, pipeline 100 processes the events through the propagation analysis stage 120 (described with FIGS. 3 and 4A below), clustering analysis stage 130 (described with FIGS. 4B-4D and 5A-5D below), and post processing stage 140 (described with FIG. 5E below). Pipeline 100, when it is deployed in a social network, takes advantage of social connections or social graphs and the likes on the network.

On a social network, malicious perpetrators may create fake accounts and plant them in social connections or circles (e.g., join social circles or invite other users, real or fake, to join social circles). The fake accounts are used to perpetrate malicious attacks.

Pipeline 100 is implemented to identify any social network attack which leaves a trail of attack signals propagating through a social graph. Attack examples include account hijacking, spam clusters (a.k.a. spam farm), bulk creation of fake accounts, production of content on behalf of users in violation of the system policies, etc. A system that deploys pipeline process 100 or the like may analyze user data in a social network to identify, for example, a suspicious pattern of user behavior and/or other malicious behavior propagating over the social network from user to user.

For example, after an event associated with a user is identified, reported, or detected at the event detection stage 110, if the event propagates through a social graph, which the user in on, the event may spread to other users on the same social graph and/or different social graphs. Pipeline 100, in the propagation analysis 120 stage and clustering analysis 130 stage, follows the spread or propagation of the attack event on the social graphs.

The propagation of the events that are the same, similar, or related to the a detected event on a social network provides reliable evidence or a higher level of confidence that the events are attack events. At the post processing 140 stage, the evidence is analyzed to provide a level of confidence that the events are attack events. Post processing 140 stage may also reveal that the users on the social graphs are attackers or sybil users (who might have created the accounts in the first place or hijacked them). Pipeline 100 and it stages are described further below with FIGS. 3-5.

Figure 2:
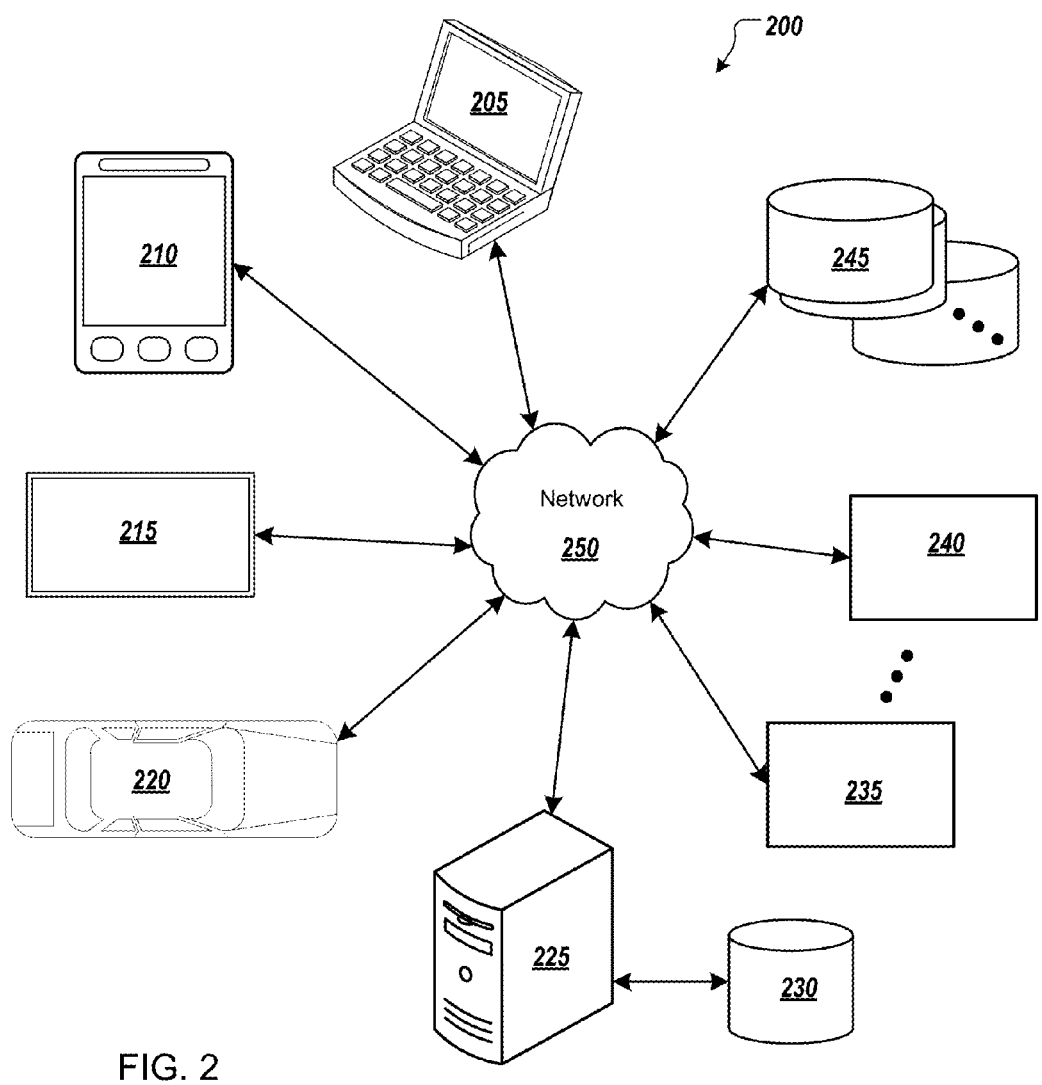
FIG. 2 shows an example environment suitable for some example implementations.

FIG. 2 shows an example environment suitable for some example implementations. Environment 200 includes devices 205-245, and each is communicatively connected to at least one other device via, for example, network 260 (e.g., by wired and/or wireless connections). Some devices may be communicatively connected to one or more storage devices 230 and 245.

An example of one or more devices 205-245 may be computing device 705 described below in FIG. 7. Devices 205-245 may include, but are not limited to, a computer 205 (e.g., a laptop computing device), a mobile device 210 (e.g., smartphone or tablet), a television 215, a device associated with a vehicle 220, a server computer 225, computing devices 235-240, storage devices 230 and 245.

In some implementations, devices 205-220 may be considered user devices (e.g., devices that may be used by users to perpetrate attack events and/or report attack events). Devices 225-245 may be devices associated with service providers (e.g., used by service providers to provide services (e.g., including attack detection and mitigation, and/or store data).

For example, a user (e.g., Alice) may access, view, and/or share content of a webpage using user device 205 or 210 on a social network supported by one or more devices 225-245. Alice may receive a malicious message and report the message to the social network (e.g., to an administrator or the social network or using a reporting page provide by the social network). The social network may be executing programming codes that implement pipeline 100 on by one or more devices 225-245. The event detection 110 stage of the pipeline 100 receives Alice's report of the event and, after one or more optional verification of the event, works the event through the other stages of pipeline 100, which is described above and further described below.

Any stage 110-140 (FIG. 1) may be executed sequentially, parallelly, or a combination thereof. For example, a system may contain many users on many social graphs, with each user being associated with multiple events. Pipeline 100 (FIG. 1) may start with users on a social graphs and/or users regardless of their associated social graphs. Pipeline 100 may start with detecting different events associated with one user, the same and/or similar events associated with different users, or a combination thereof.

Figure 3:
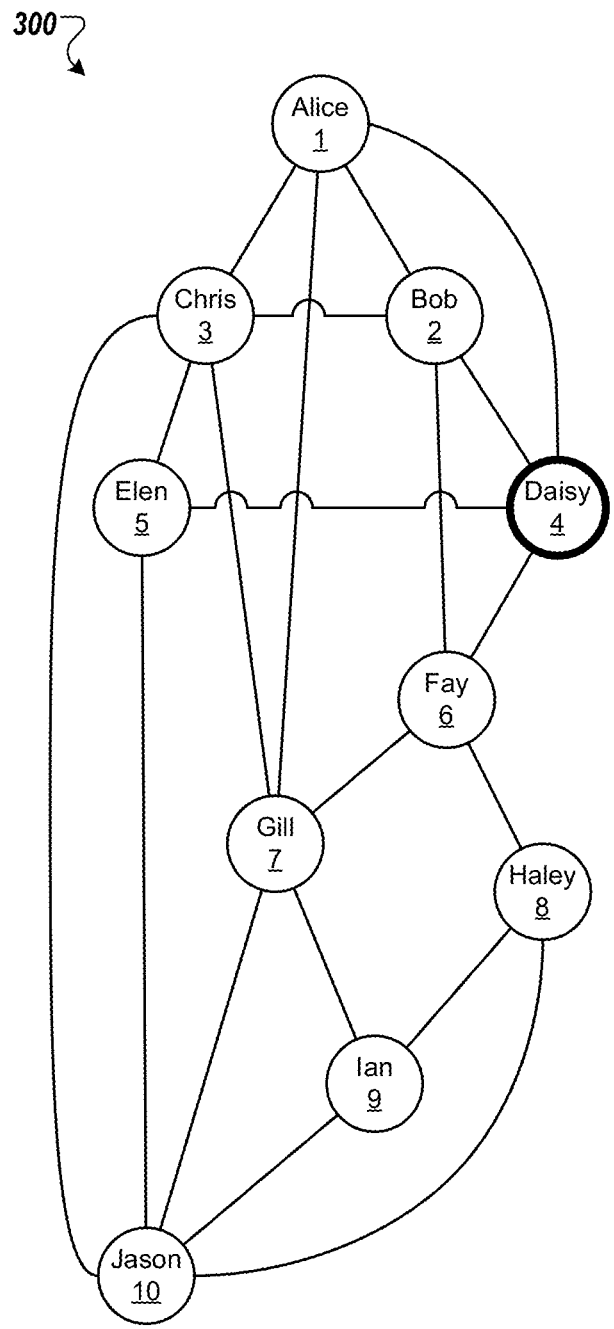
FIG. 3 shows an example social graph.
Figure 4B:
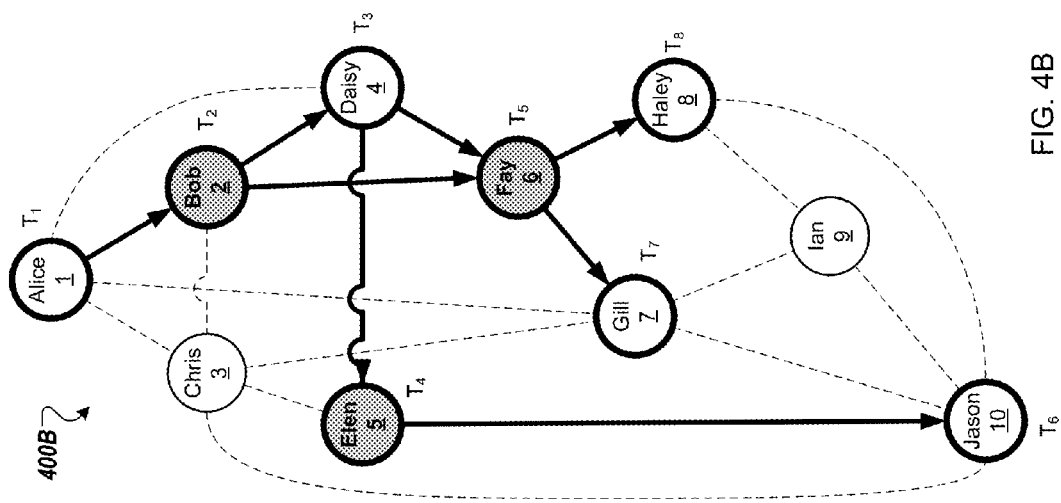
FIGS. 4A-4D show a few stages of an example directed acyclic graph created based on the social graph of FIG. 3.
Figure 4A:
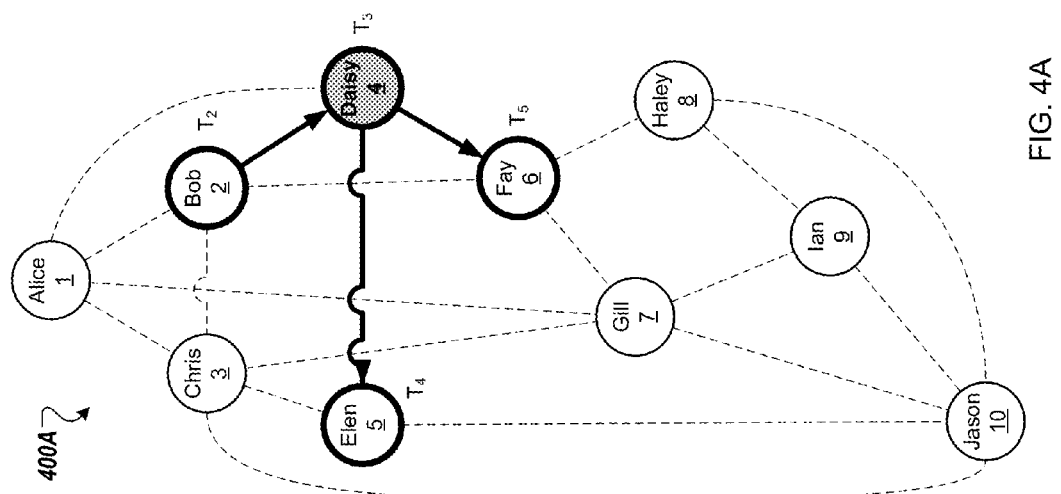
Figure 4D:
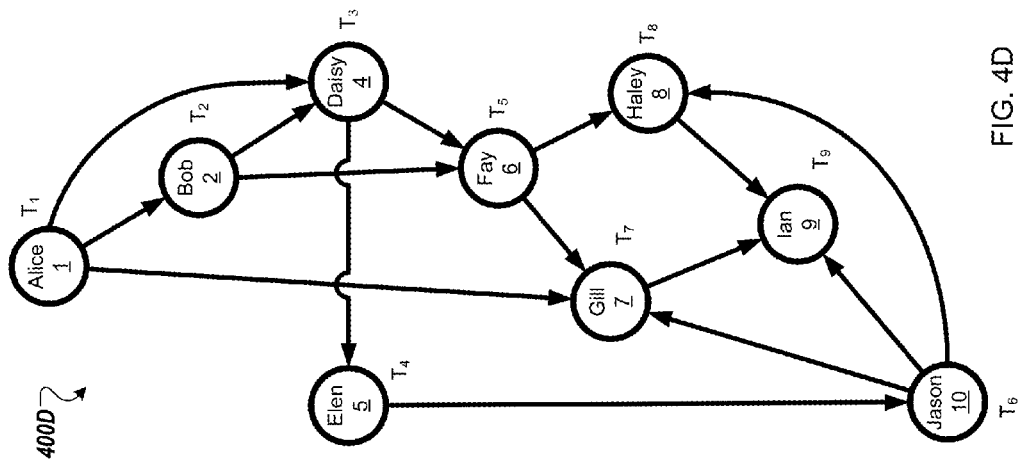

For illustration purposes, FIGS. 3-4D are described with one set of same and/or similar events on one social graph. FIGS. 5A-5D are described with multiple sets of same and/or similar events on one social graph.

FIG. 3 shows an example social graph. A social graph can have any number of nodes (e.g., from one node to five, 10, 50, 100, 500, 1000, a higher number, and any number in between). Each node is associated with a user. The size and composition of a social graph are based on the users and connections among the users on the graph. Social graph 300, shown with 10 nodes, is a graph where a link or edge shown between two users (e.g., two nodes associated with the two users) indicates that there is a two-way connection between the two users (e.g., between Bob at node 2 and Daisy at node 4). Social graph 300 may be previously established, pre-established, or established when needed (e.g., in pipeline 100, FIG. 1).

In some implementations, event detection 110 (FIG. 1) may start with a user (e.g., Daisy) on a social graph (e.g., graph 300) and identify or detect one or more events associated with the user (e.g., a message associated with Daisy is reported as spam or malicious). In other implementations, event detection 110 may start with a user (e.g., Daisy) or, if executed in parallel, two or more users including, for example, Daisy. Event detection 110, propagation analysis 120, or another module may then determine or identify the social graph that Daisy is on (e.g., social graph 300).

If social graph 300 needs to be established, starting with user Daisy, social graph 300 may be built out (e.g., conceptually or in a digital representation) using Daisy's social connections to users Alice, Bob, Elen, and Fay (e.g., from her contact list and/or social circles, etc.). The build out step then repeats with the social connections of Alice, Bob, Elen, and Fay and so on (e.g., with the social connections to newly identified users, e.g., Chris, Gill, Haley, and Jason, that have not been considered in the build out) until all users have been considered (e.g., after processing user Ian, whose is connected to users all have been considered in the build out). When social graph 300 is built out, user Daisy is identified associated with node 4 in this example.

In some implementations, the event detection 110 stage analyzes data stream (e.g., user interactions and/or communication messages, etc.) to identify suspicious events that may be evidence of an attack. Any attack events, messages, anomalies, and/or abuses may be detected using any detection technique. In some implementations, machine learning may be employed in this stage to identify potential attack events.

Examples of possible attack events, whose propagation can be tracked by the system, includes but are not limited to the followings: any specific user action (sharing, posting, commenting, feedback, such as "+1" or "like", etc.), any changes in the user behavioral pattern, the production of any content, any changes in the reputation of the user according to some known metrics, etc.

Identifying or detecting an event includes identifying at least the type of the event and at what time it has occurred (e.g., the event associated with Daisy occurs at a time $T_3$). The type of the event may be used to distinguish among different possible events or types of events that may occur and may be used to track the propagation of events independently (e.g., in parallel processes).

FIGS. 4A-4D show a few stages of an example directed acyclic graph created based on the social graph of FIG. 3. Although more than one type of events may be associated with users on a social graph and there can be many social graph on a network (e.g., one type of events is referred to same and/or similar events), FIGS. 4A-4D are described using just one type of events on one social graph to illustrate a directed acyclic graph (DAG). The DAG is created to show, for example, propagation of an event or a type of events. The propagation is analyzed to determine whether the event is an attack event, the degree of the attack, directions of the attack, the attackers (e.g., fake or sybil nodes), etc. In actual scenarios, a user may be associated with multiple events of multiple types, and multiple DAGs may be created for a type of events associated with a social graph. Examples of these scenarios are described in FIGS. 5A-5D further below.

FIG. 4A is described in association with the propagation analysis stage (120, FIG. 1). The propagation analysis 120 gathers the events recognized from the previous stage (e.g., event detection 110) and analyzes or determines possible correlation of the events using a directed social graph or directed acyclic graph (DAG) 400A. Propagation analysis 120 attempts to identify whether the events are likely to be linked to a social network based phenomenon (e.g., a social network based attack) or rather are false positive events.

In an attack using fake users on a social network, the attacking events are likely linked together following a social graph. Many of these events are likely traceable to a plausible propagation path on the social graph by analyzing their similarities and/or temporal occurrences. If the events are not correlated to the social network structure, such as random false positive events, once the events are projected on the social network they are likely to appear as isolated events (e.g., not possible to cluster them to identify propagation paths).

Propagation analysis 120 and clustering analysis 130 uses a social network structure or social graphs to confirm or increase confidence level of attacks on a social network or attacks using a social graph or the like.

In some implementations, propagation analysis 120 follows an algorithm that considers two events occurring in association with two users, e.g., Bob at node 2 and Daisy at node 4. The two events propagate (e.g., from Bob to Daisy) if the following conditions are all met: (1) Bob (at node 2) has a social connection (e.g., a link, arc, or edge) with Daisy (at node 4). (2) The two events occurred at both Bob and Daisy have the same type (e.g., if the events are messages, they are the same, similar, or related; if the events are actions, they are the same, similar, or related). (3) The event at Daisy occurs at a time $T_3$ that is later than the event at Bob occurs at a time $T_2$ (i.e., $T_3$ is later than $T_2$).

An event can possibly have caused another same or similar event only if the latter event has occurred later and if the user (e.g., Bob) causing the latter event is known to the other user experiencing the event (e.g., Daisy). The social graph that includes Bob and Daisy provides the evidence that Bob knows Daisy. The temporal factor provides evidence of a movement or propagation of the events and the direction of the movement. The movement and direction can be used to build a DAG to represent followership of attacks.

For a specific event type (e.g., an email message, a message posted on a social network, etc.), the social edges corresponding to a pairs of correlated events (e.g., pairs of messages that are the same or similar) can be arranged in a graph structure showing how an event of the event type has spread from one node to other nodes. The graph structure becomes a Directed Acyclic Graph (DAG) if formed with a temporal order.

FIG. 4A shows the DAG 400A, which is at a very early stage and initially consists of only one node Daisy 4 (shown in heavy dark circle). Node 4, which is identified by the previous event detection 110 stage, is used to form DAG 400A for attack propagation analysis. The event detected to occur at node 4 occurs at a time $T_3$.

Using social graph 300, FIG. 3 (shown as light-circled nodes connected with broken-line edges with DAG 400A merely for facilitating discussion herein), the nodes adjacent to node 4 are identified (e.g., Bob at node 2, Elen at node 5, and Fay at node 6). Applying the above described algorithm for propagation analysis reveals that, for example, events of the same type have occurred at node 2, node 5 and node 6, at times $T_2$, $T_4$, and $T_5$, respectively. With this information, DAG 400A is expanded to include nodes 2, 5 and 6. The edge from node 2 is shown pointing to node 4 due to, for example, $T_2<T_3$. The edge from node 4 points to node 5 due to, for example, $T_3<T_4$. The edge from node 4 points to node 6 due to, for example, $T_3<T_5$.

DAG 400A shows that, for example, events of the same type are propagating through some nodes. If an event is the posting/reposting of a message or a post on a social network, two posts are considered of same type if they have the same content or similar content. The propagation of the event is the posting and reposting of the message or similar message (e.g., the message content or a link or hash code of the message), for example, from node 2 to node 3 then to nodes 5 and 6. The timestamps (e.g., $T_2$, $T_3$, $T_4$, and $T_5$ in microseconds) of the events may be the times of receiving the message by Bob, Daisy, Elen, and Fay.

Propagation analysis 120 may be executed in a parallel processing computing system, network, or environment that can identify large or very large (e.g., millions, hundreds of millions, billions, etc.) pairs of plausibly correlated events of different types (e.g., using different social graphs) in different attacks at the same time.

Figure 4C:
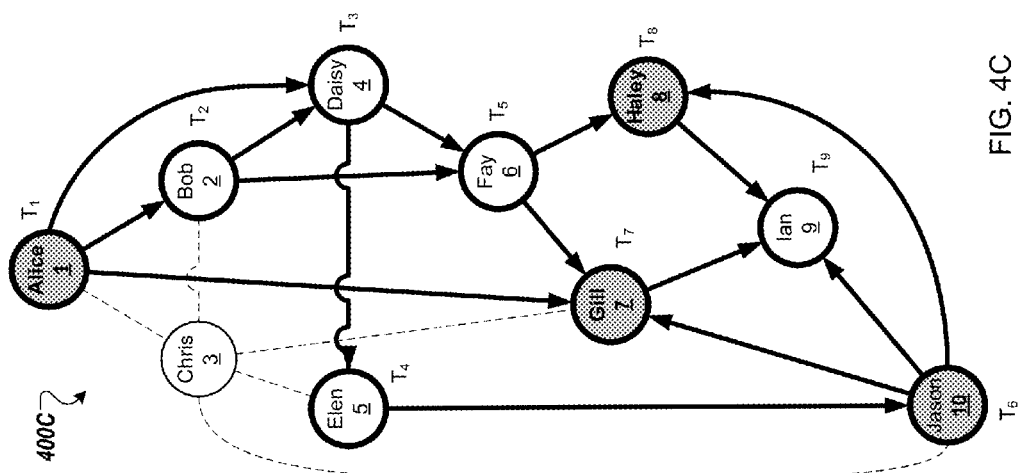

FIGS. 4B-4D are described in association with the clustering analysis stage (130, FIG. 1). The propagation stage 120 reveals a collection of pairs of propagated events (e.g., pairs of events between nodes 2 and 4, between nodes 4 and 5, and between nodes 4 and 6) from analyzing the event occurred at node 4. For the discussion herein, nodes 2, 5, and 6 are referred to as "new node." In the clustering analysis stage, the propagation analysis is repeated with each new node until there is no more new node or another condition (e.g., a number of nodes have been analyzed, the DAG has grown to a size greater than a threshold size, etc.).

FIG. 4B shows the results after propagation analysis with new nodes 2, 5 and 6. The results may be obtained from parallel processing, serial processing, or any combination thereof of the following analyses. At any point during an analysis or before a new analysis, the analysis may reach a stopping condition, for example, when an event has found at enough nodes to provide a high certainty that the event is an attack event.

In this example, a same or similar event occurs at every node except node 3. Propagation analysis of node 2: Using social graph 300, FIG. 3 (shown as light-circled nodes connected with broken-line edges with DAG 400B), the nodes adjacent to node 2 are identified (e.g., nodes 1, 3, 4, and 6). Node 4 has been analyzed previously and is not considered here. Applying the above described algorithm for propagation analysis reveals that events of the same type have occurred at nodes 1 and 6, at times $T_1$, and $T_5$, respectively. With this information, DAG 400B is expanded to include nodes 1 and 6 (though, node 6 is already included from a previous analysis). The edge between nodes 1 and 2 is shown pointing to node 2 due to, for example, $T_1<T_2$. The edge between nodes 2 and 6 is shown pointing to node 6 due to, for example, $T_2<T_5$. DAG 400B shows that the same event may have been propagated to node 6 from node 4, node 2, or both nodes. In some implementations, second and subsequent edges pointing to a node (e.g., node 6) may not be included in a DAG formation. For example, node 6 may be pointed to, from node 4 or 2, but not both.

Propagation analysis of node 5: The nodes adjacent to node 5 are identified as nodes 3 and 10. Node 3 is eliminated because no same or similar event occurs there. Applying the above described algorithm for propagation analysis reveals that events of the same type have occurred at node 10 at a time $T_6$. DAG 400B is expanded to include node 10. The edge between nodes 5 and 10 is shown pointing to node 10 due to, for example, $T_4<T_6$.

Propagation analysis of node 6: The nodes adjacent to node 6 are identified as nodes 2, 4, 7, and 8, with nodes 2 and 4 having previously considered. Applying the above described algorithm for propagation analysis reveals that events of the same type have occurred at nodes 7 and 8, at times $T_7$, and $T_8$, respectively. DAG 400B is expanded to include nodes 7 and 8. The edge between nodes 6 and 7 is shown pointing to node 7 due to, for example, $T_5<T_7$. The edge between nodes 6 and 8 is shown pointing to node 8 due to, for example, $T_5<T_8$.

FIG. 4C shows the results after propagation analysis with new nodes 1, 7, 8, and 10. Again, the results may be obtained from parallel and/or serial processing, and analyses may reach a stopping condition at any point. Propagation analysis of node 1 does not yield any new node because adjacent nodes 2, 4, and 7 have been previously added to DAG 400C and node 3 does not associate with an event of the same type. In some implementations, directed edges from node 1 to nodes 4 and 7 may be added due to, for example, $T_1$ is earlier than $T_3$ and $T_7$.

Propagation analysis of node 7 yields one new node, node 9, and one new edge pointing from node 7 to node 9 (e.g., $T_7<T_9$). In some implementations, a directed edge from node 10 to node 7 may be added due to, for example, $T_6<T_7$.

Propagation analysis of node 8 yields no new node. In some implementations, a directed edge from node 8 to node 9 (e.g., $T_8<T_9$) and a directed edge from node 10 to node 8 (e.g., $T_6<T_8$) may be added. Propagation analysis of node 10 yields no new node and, depending on implementations, may yield one new directed edge from node 10 to node 9 (e.g., $T_6<T_9$). Propagation analysis of node 9, a new node added in the analysis of node 7, yields no new node and no new directed edge. After the analysis of node 9, in this example, there is no more new node to analyze.

FIG. 4D shows an example DAG resulting from clustering analysis. DAG 400D does not include node 3 and its connecting edges. The above description with respect to FIGS. 4A-4D illustrates how a DAG may be formed conceptually. In implementations, DAGs associating with different events, different users, or both may be formed in parallel processing.

FIGS. 5A-D show additional examples of DAGs. Social graph 510 shows that a user (e.g., one of a-j) may experience zero, one, two, three, or more events of types X-Z. X, Y, and Z are used to denote event types (e.g., similar and/or same events, as described above, are considered events of the same type). As described below, an event X (or Y or Z) refers to an event of type X (or Y or Z). Two or more events X (or Y or Z) refer to same and/or similar events, which are of type X (or Y or Z).

Graph 510 shows, for example, user a experiences an event X; user b experiences three events X, Y, and Z, and user c experiences no event, etc. The edges of graph 510 represent the propagations of events as described above (e.g., based on timestamps and/or other factor). For each type of events (e.g., X, Y, or Z), one or more DAGs or subgraphs in one or more clusters may be generated in any manner.

For example, A cluster that includes subgraphs 520-524 (FIG. 5B) may be generated based on social graph 510 for events X. A cluster that includes subgraph or DAG 530 (FIG. 5C) may be generated based on social graph 510 for events Y. And a cluster that includes subgraph or DAG 540 (FIG. 5D) may be generated based on social graph 510 for events Z. Subgraphs 520-540 are shown over (e.g., on top of) graph 510 for reference.

As an example of generating one or more clusters for a type of event X, Y, or Z, a list of (user, event) pairs may be identified and constructed. The list may be based on a social graph or other graph (e.g., graph 510). For example, the user-event pairs for graph 510 (grouped by event types for easy readability) are:

(a, X), (b, X), (e, X), (f, X), and (i, X) [list: part 1]
(b, Y), (d, Y), (f, Y), and (g, Y) [list: part 2]
(b, Z), (d, Z), (e, Z), (f, Z), (h, Z), (i, Z), and (j, Z) [list: part 3]

Figure 5A:
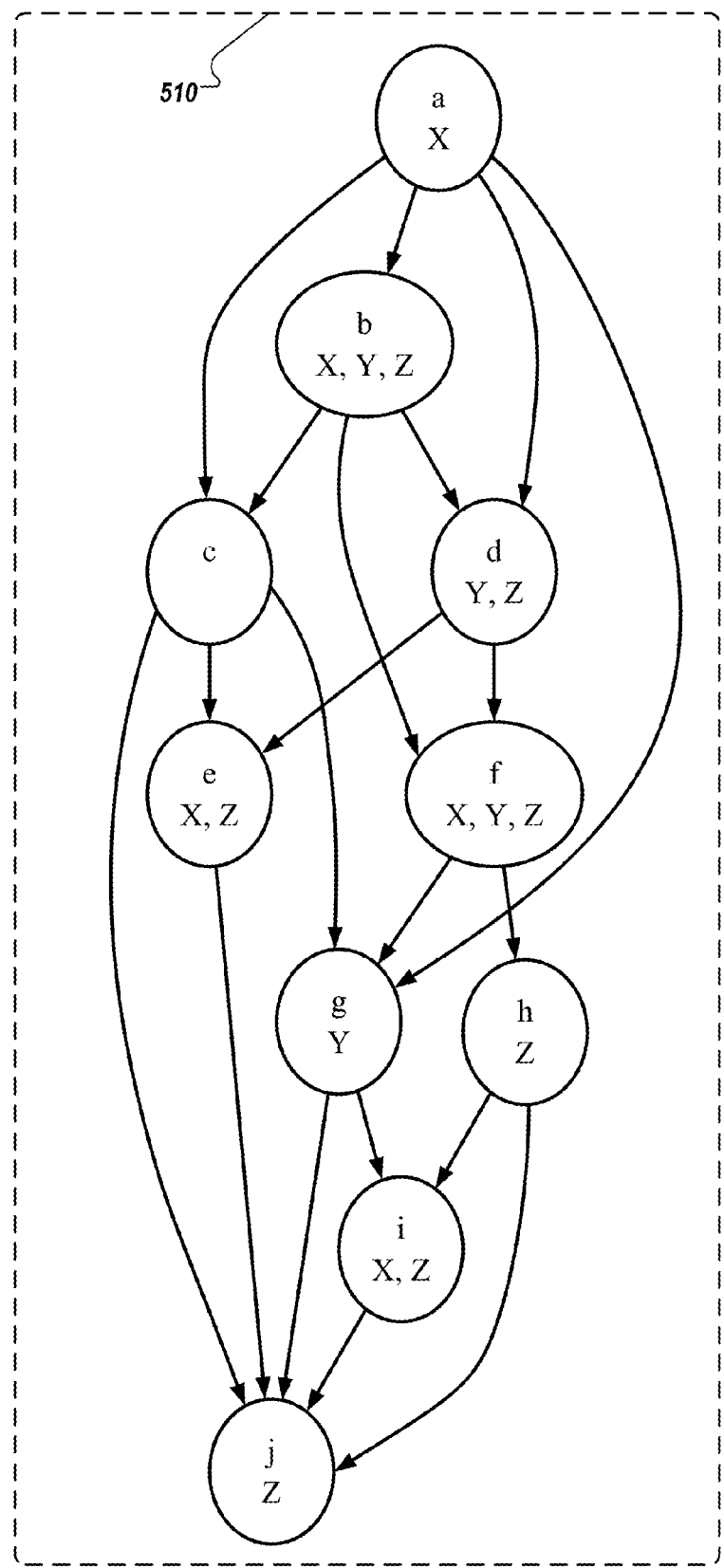
FIGS. 5A-D show additional examples of DAGs.
Figure 5B:
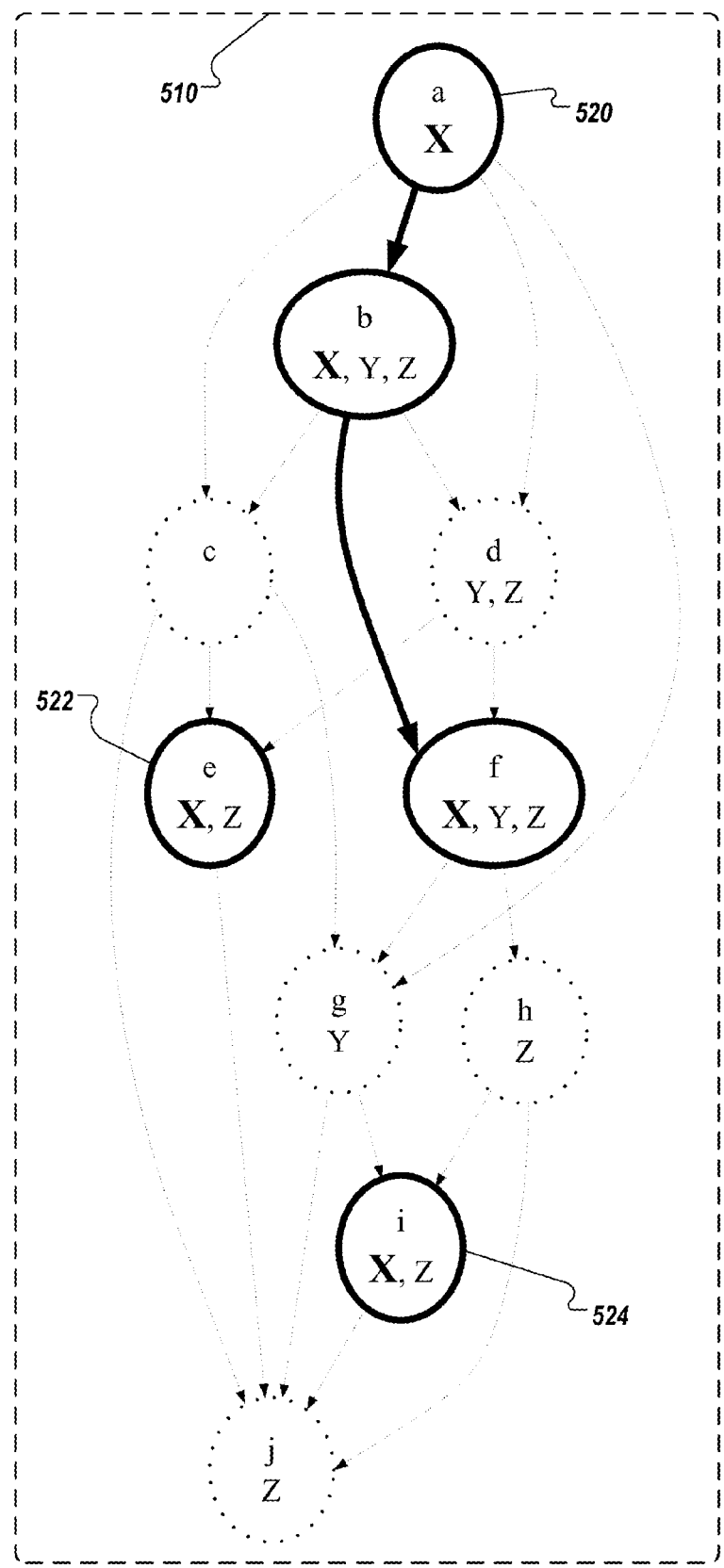

With each group of events of the same type (e.g., same and/or related events), such as events X, Y, or Z, one or more clusters per event X, Y, or Z may be constructed. For example, based to part 1 (above) of the generated list, users a, b, e, f, and i of graph 510 all experience events X (e.g., events of type X). The clustering stage 130 (FIG. 1) determines that there are multiple distinct components in the graph 510 with events X and creates, for example, a cluster of one or more subgraphs 520-524 (FIG. 5B). Subgraph 520 is a DAG with users a, b, and f. Since user e and i, which also experience events X, are not connected to any of users a, b, and f, users e and i are in their own subgraphs or DAGs 522 and 524, respectively. Note that all nodes in subgraphs 520-524 are nodes in a single graph 510. A single graph (e.g., graph 510) can include multiple completely disjoint subgraphs (e.g., 520-524). A graph (e.g., graph 510) is represented as a collection of edges, and this collection of edges does not have to be connected in a cluster (unconnected edges in the cluster are shown as dotted edges).

Figure 5C:
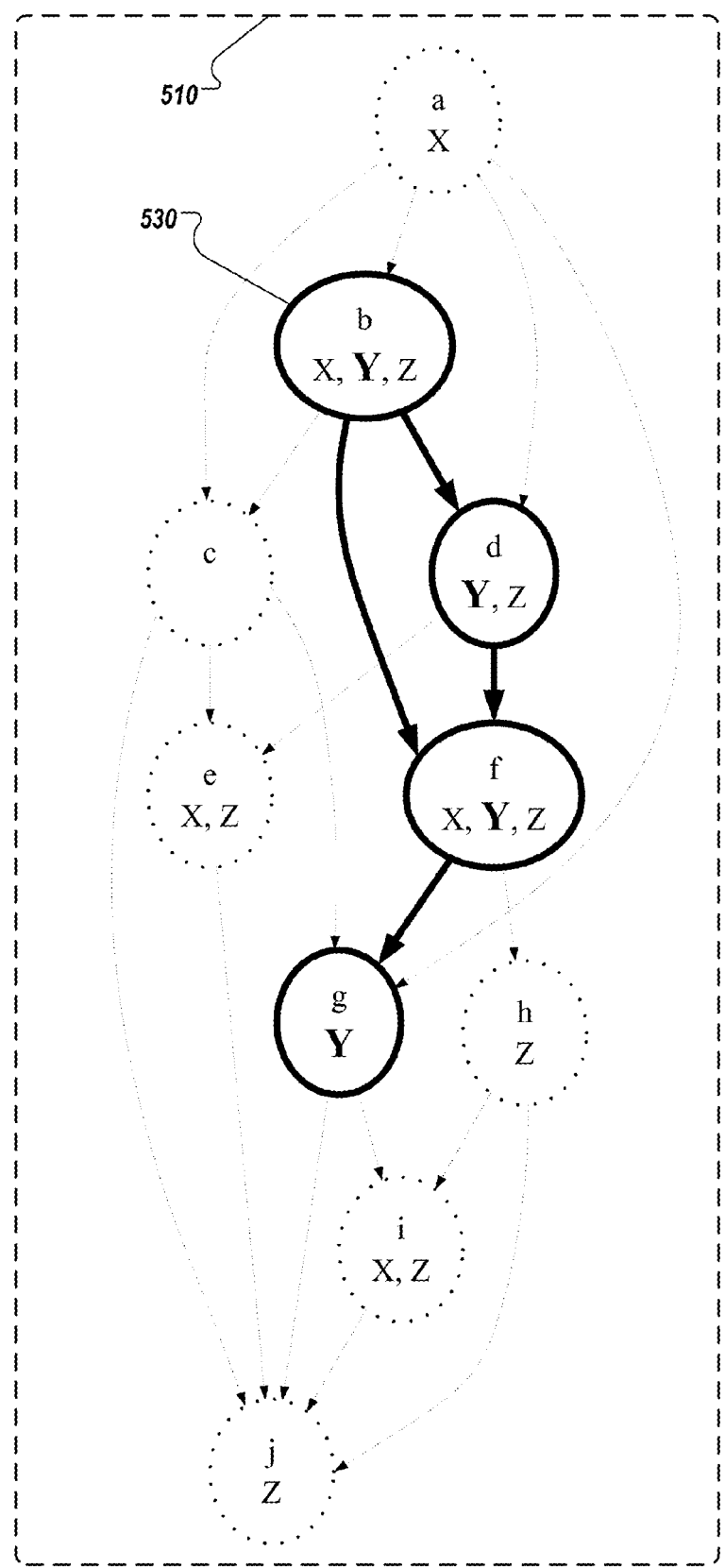
Figure 5D:
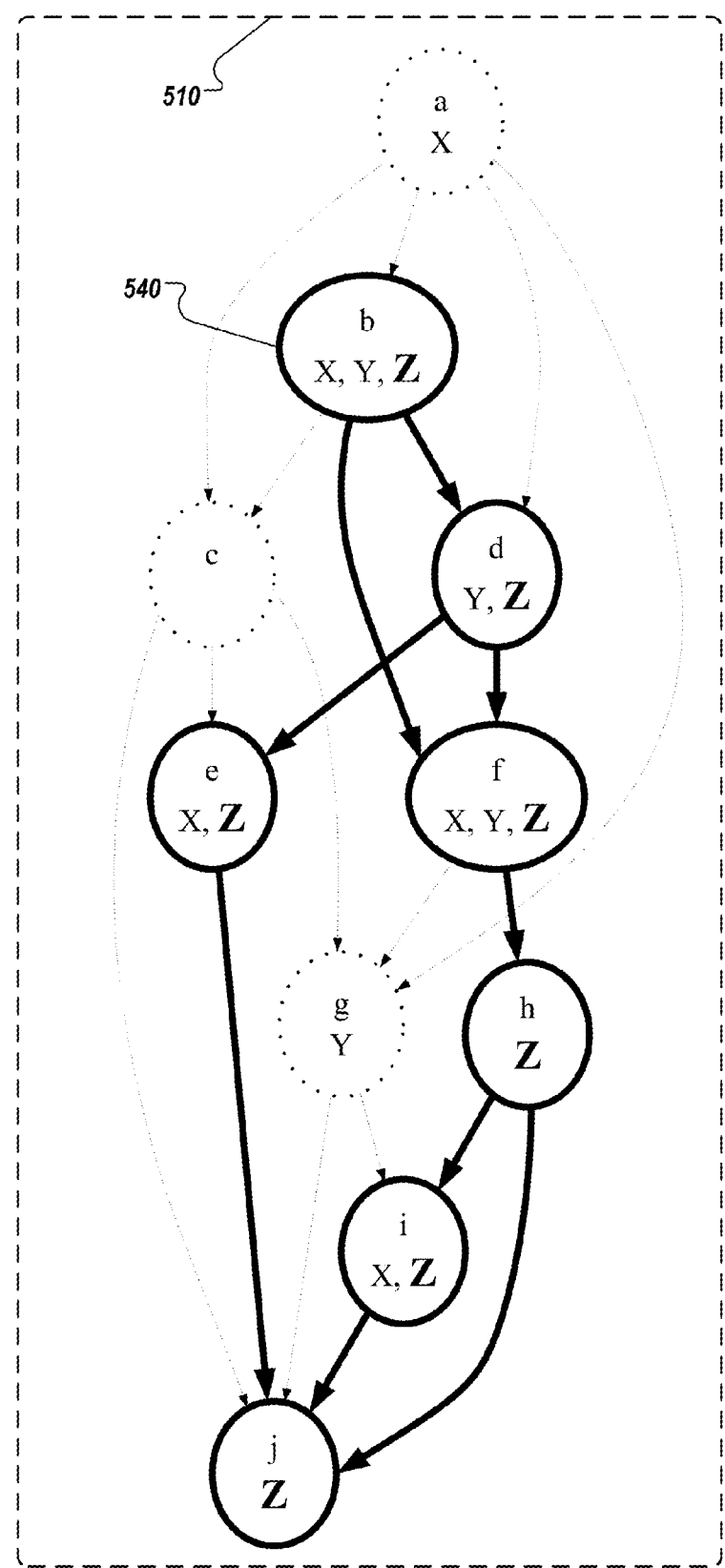

Based to part 2 (above) of the generated list, users b, d, f, and g of graph 510 all experience events Y and are represented in DAG 530 (FIG. 5C). Based to part 3 (above) of the generated list, users b, d-f, and h-j of graph 510 all experience events Z and are represented in cluster 540 (FIG. 5D). Each cluster, which groups one or more subgraphs or DAGs per event X, Y, or Z, is a distinct subset of the graph 510.

In some implementations, one processing goal may be constructing a list (event, user_a, user_b) tuples that indicate user_a and user_b had the event, and user_a had it before user_b, and user_a and user_b are linked in the social network. Each tuple represents an edge in a DAG. For example, a list of tuples representing subgraph or DAG 540 may be:

(event Z, b, d), (event Z, d, e), (event Z, e, j), and [Set 1]
(event Z, b, f), (event Z, f, h), (event Z, h, i), (event Z, i, j) [Set 2]

In some implementations, a tuple may include more than two users. For example, tuples of Set 1 may be represented by (event Z, b, d, e, j) and tuples of Set 2 may be represented by (event Z, b, f, h, i, j)

Tuples representing events X for forming subgraphs 520-524 and tuples representing events Y for forming subgraph or DAG 530 may be generated similarly.

Subgraphs 520-540 may be generated using pipeline 100 (FIG. 1) or one or more other processes that detect the events X, Y, and Z. The pipeline then analyzes the propagations of the events, such as generating tuples that represent events X propagate from users a to b then from b to f.

Then the processing in the clustering stage turns the lists of labeled edges or tuples into multiple DAGs per event that correspond to the connected components of graph 510. For example, the clustering stage creates subgraph 520 based on the tuples that represent events X propagate from users a to b then from b to f. A post processing stage may be executed to identify non-attacking events, attacking events and/or potential attacking event. The algorithm for each stage and/or goal, which may create intermediary results, can be executed in parallel on, for example, the entire graph 510, on more than one graph, on the users, and/or events.

Figure 5E:
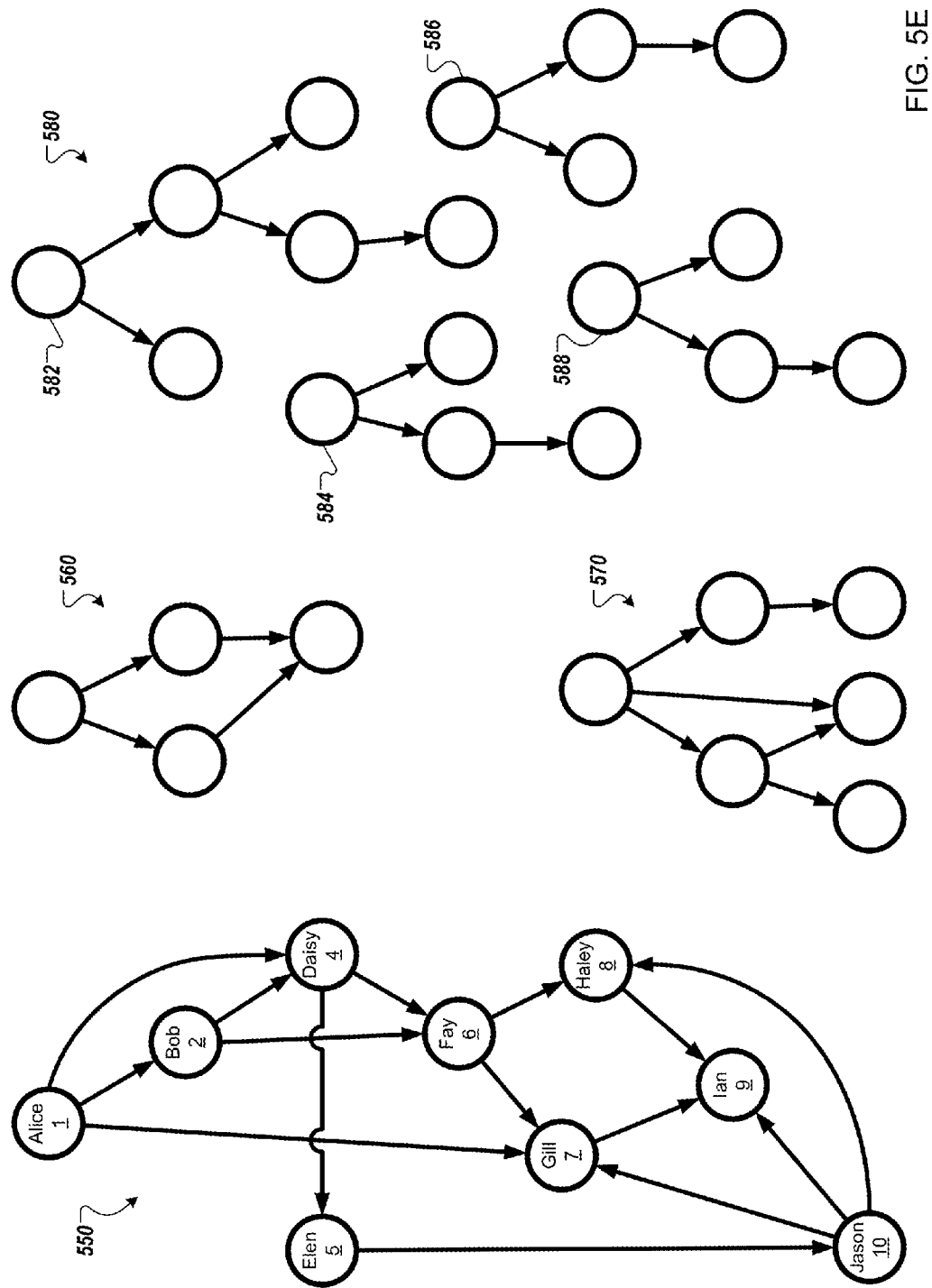
FIG. 5E shows examples of additional directed acyclic graphs.

FIG. 5E shows examples of additional directed acyclic graphs. FIG. 5E is described in association with the post processing stage (140, FIG. 1). FIG. 5E shows four clusters of DAGs 550-580. Each cluster, which may include one or more DAGs, may be formed to analyze an event. Cluster 550 has nine nodes. Cluster 560 has four. Cluster 570 has 6. And Cluster 580 has 18 nodes in four subgraphs or DAGs 582-588.

In some analyses, such as for identifying an attack or a social network abuse, the clarity of an attack or abuse may be revealed by the size of a DAG or cluster (e.g., cluster 580 with 18 nodes shows a clearer sign of attack or abuse than the other cluster 560). The bigger the DAG or cluster, the higher the probability that the related events associated with it are correlated to an attack (e.g., on a social network). False positive events, which are not related to the social structure, do not cluster together. Analyses of false positive events, which do not propagate or do not propagate to too many users, produce small DAGs or fewer DAGs in clusters.

Sharing of an event (e.g., posting a message) is not suspicious. However, the sharing or the event can be considered suspicious if the modality in which the event has been propagated is suspicious and/or the group of users propagating the event is suspicious.

Generated DAGs may be processed in different methods to answer different questions or provide different answers to the same questions. For example, DAGs may be processed to determine a fraction or ratio of public/private posting or sharing. Are event sharing to public users (e.g., broadcast to many users including those not in social circles) or private users (e.g., sharing only to a small number of users or to users in social circles). On a social network, where a large set of users are provided the options to share posts in public and private, it is expected that a fraction users use each option. If a large random group of users is selected, it is statistically unlikely that all of them have adopted sharing in the same way (e.g., public or private) by chance.

Therefore, if a large number of users on a social graph are sharing to the public, it is a clearer sign that they are acting according to a deterministic control (e.g., they are all under the control of the same attacker, account hijacker, or they are all bots or fake accounts, etc.). In the case of a high or very high fraction of public shares, it is clear that a spam networks and hijackers have all the interest to share the message to the widest possible audience.

In another post processing example, a DAG may be evaluated based on other DAGs (e.g., a large number of other DAGs, which may be created using parallel or massively parallel processing methods). For example, the average number of nodes of the large number of other DAGs is X and the number of nodes of the DAG under evaluation is greater or much greater than X, the underlying events used to create the DAG under evaluation may be concluded as attack events, likely attack events, suspicious events (e.g., to be reviewed by an administrator), etc.

The results from post processing may be stored (e.g., in storage 245, FIG. 1) for further processing and/or reporting. The results may trigger actions that may be automatic (e.g., not human intervention), semi-automatic, or manual (e.g., performed by an administrator). For example, the size of a generated DAG is at least a threshold size (e.g., five nodes), the events occurred nodes may be remove or mitigated (e.g., removing/deleting five posts of the same content at those nodes). The top results that do not trigger automatic actions may be provided to social network administrators for further analysis and/or actions.

Figure 6:
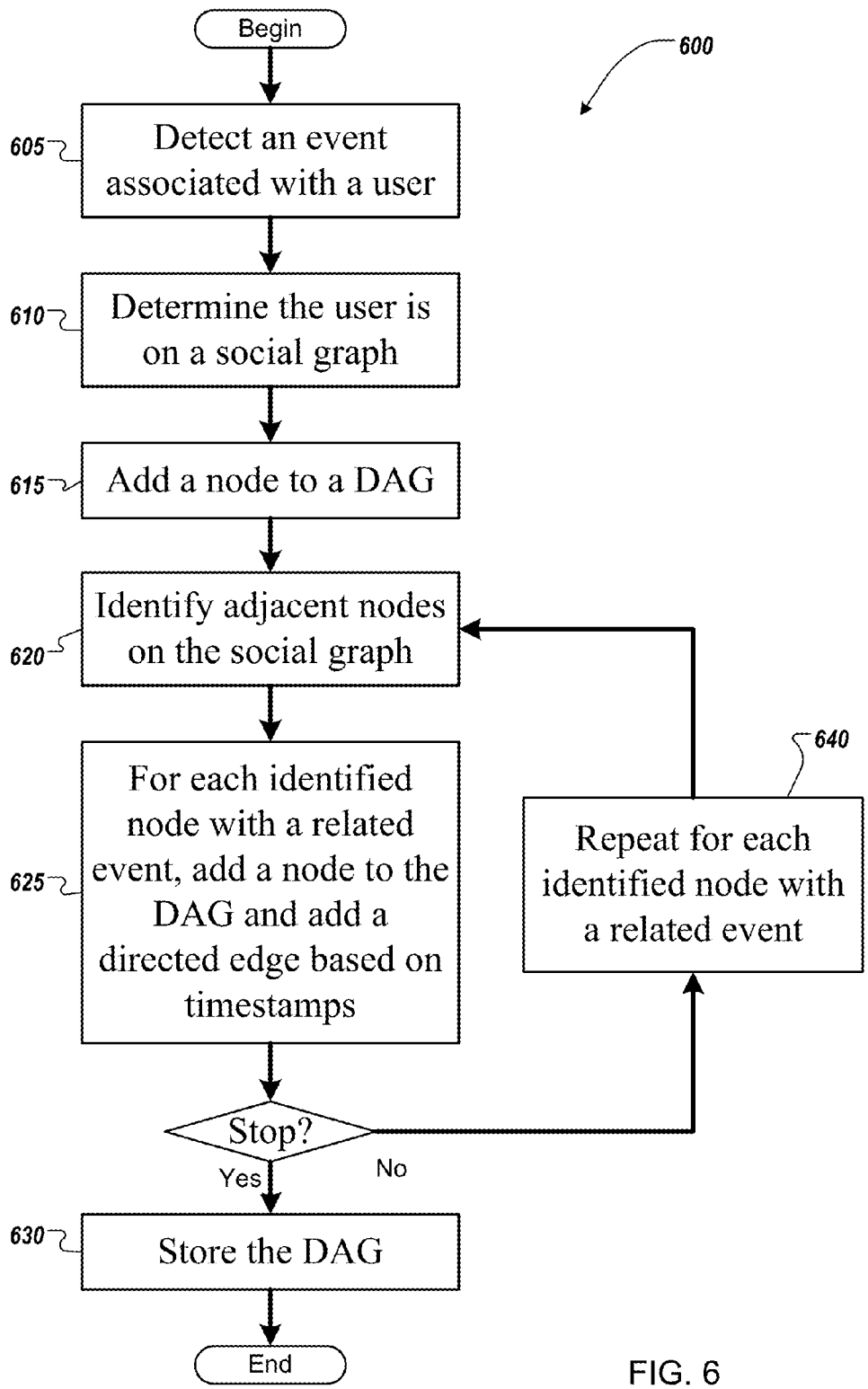
FIG. 6 shows an example process according to some implementations.

FIG. 6 shows an example process according to some implementations. Process 600 may start with detecting an event associated with a user at block 605. For example, the user received a spam email message or an unsolicited post on a social network. At block 610, a system implementing process 600 may determine that the user is associated with a node on a social graph. For example, the user is connected with one or more social connections (e.g., has an address book with the online contact information of at least one other users or is on a social network). The increase confidence of an event being an malicious event or detect an online attack, a directed acyclic graph (DAG) structure may be employed.

At block 615, a node corresponding to the node on the social graph may be added to a DAG. The added node on the DAG may be referred to as a current node or by another label. A time (e.g., time of occurrence) associated with the detected event (block 605) may be determined at any point during process 600 before the time is needed used in the process. At block 620, one or more nodes adjacent to the node on the social graph are determined.

At block 625, for each of the adjacent node that has associated with it an occurrence of an event the same as or related/similar to the event detected at block 650: add a node (referred to as a new node) to the DAG corresponding to the adjacent node on the social graph and add a directed edge between the newly added node and the current node. The direction of the directed edge is pointed to the node associated with a later timestamp. In some implementations, the direction of the edge may be reverse (e.g., point to the node associated with an earlier timestamp). At block 625, for each of the adjacent node that does not have associated with it an occurrence of an event the same as or related/similar to the event detected at block 650, the adjacent node is dropped from processing (e.g., not considered).

If process 600 reaches a stopping condition as described above, the process stop and the DAG is stored at block 630. If a stopping condition has not been reached, the process continues to block 640, which iterates each adjacent node processed above at block 625 through the operations of blocks 620 and 625.

Process 600 may be implemented in a parallel or massively parallel computing environment, where one or more blocks shown may be executed in parallel in different processes or systems (e.g., executed concurrently or simultaneously). In some examples, process 600 may be implemented with different, fewer, or more blocks. Process 600 may be implemented as computer executable instructions, which can be stored on a medium, loaded onto one or more processors of one or more computing devices, and executed as a computer-implemented method.

Figure 7:
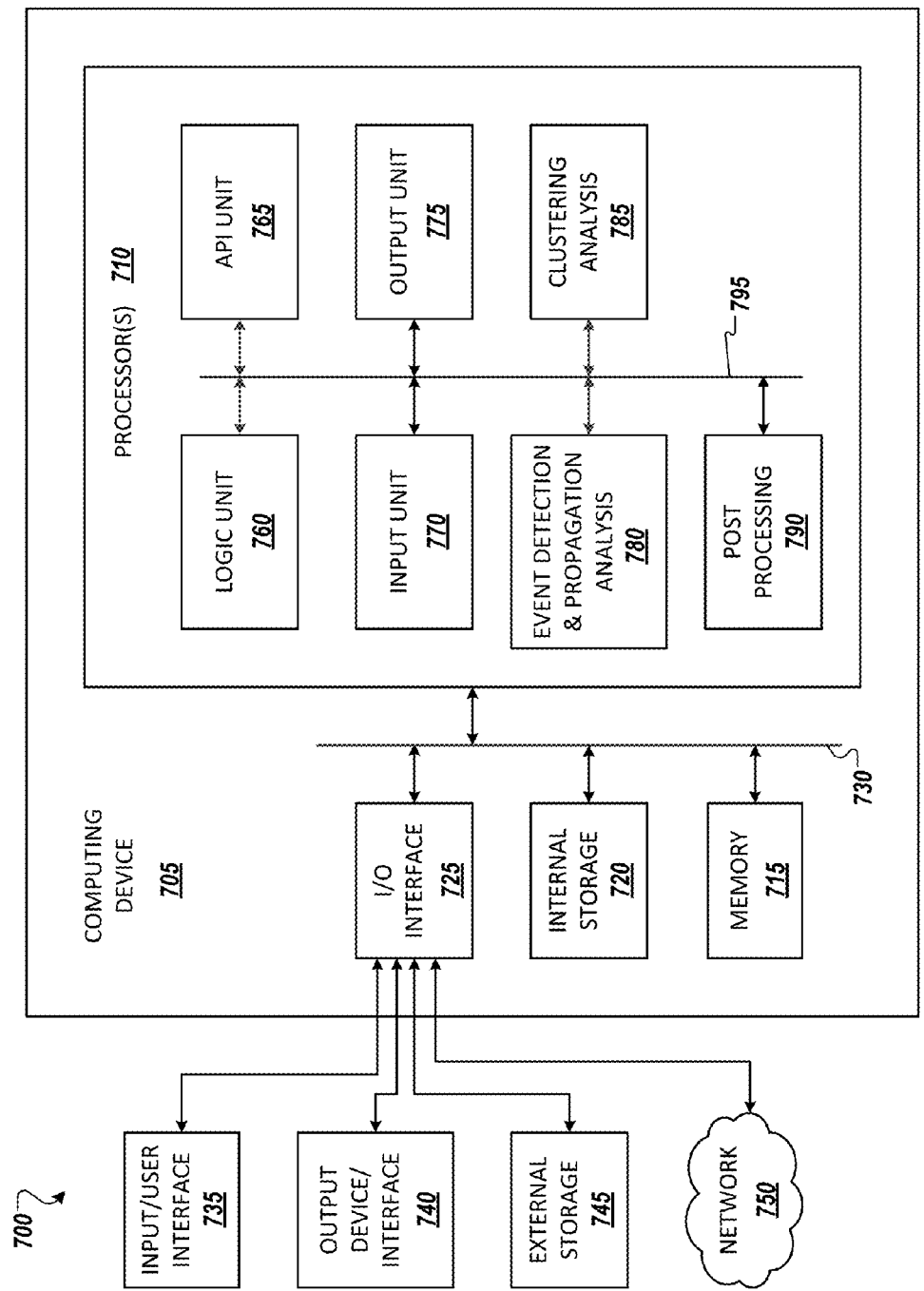
FIG. 7 shows an example computing environment with an example computing device suitable for use in some example implementations.

FIG. 7 shows an example computing environment with an example computing device suitable for use in some example implementations. Computing device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computing device 705.

Computing device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computing device 705. In other example implementations, other computing devices may function as or provide the functions of input/user interface 735 and output device/interface 740 for a computing device 605.

Examples of computing device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 705 can be communicatively coupled (e.g., via I/O interface 725) to external storage 745 and network 750 for communicating with any number of networked components, devices, and systems, including one or more computing devices of the same or different configuration. Computing device 705 or any connected computing device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all of the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, event detection and propagation analysis 780, clustering analysis 785, post processing 790, and inter-unit communication mechanism 795 for the different units to communicate with each other, with the OS, and with other applications (not shown). For example, event detection and propagation analysis 780, clustering analysis 785, and post processing 790 may implement one or more processes shown or described in FIGS. 1-6. The described units and elements can be varied in design, function, configuration, or implementation and are not limited to the descriptions provided.

In some example implementations, when information or an execution instruction is received by API unit 765, it may be communicated to one or more other units (e.g., logic unit 760, input unit 770, output unit 775, event detection and propagation analysis 780, clustering analysis 785, and post processing 790). For example, event detection and propagation analysis 780 may identify or detect an event (e.g., receive a report of an event through input unit 770) and perform propagation analysis on it as described above. Depending on implementations, the propagation analysis may be enough to provide a level of confidence that the event is an attack event. In implementations that call for more analysis, the results from event detection and propagation analysis 780 are passed to clustering analysis 785 to further analyze the detected event, as described above. After clustering analysis 785 reaches a stopping condition, which may be based on a threshold, the end social graph (e.g., no more new node), and/or another condition, the results are processed by post processing 790 to rank and/or identify the attack events or likely attack events. Actions may be taken automatically on the identified attacking events (e.g., removing the events). For the likely attack events, they may be routed via the API unit 765 and/or output unit 775 for additional analysis (e.g., analysis by an administrator).

In some instances, logic unit 760 may be configured to control the information flow among the units and direct the services provided by API unit 765, input unit 770, output unit 775, event detection and propagation analysis 780, clustering analysis 785, and post processing 790 in some example implementations described above. For example, the flow of one or more processes or implementations may be controlled by logic unit 760 alone or in conjunction with API unit 765.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method, comprising:
   detecting a plurality of events based on an analysis of a data stream by identifying the plurality of events as being associated with users on a social graph, the social graph comprising a plurality of social graph nodes and social graph edges and each of the plurality of events having a type, to receive one or more indicators of an online attack;
   analyzing propagation of the plurality of events by, for each type of the plurality of events, generating at least one directed acyclic graph (DAG) comprising a plurality of DAG nodes and DAG edges, where each DAG node on the DAG represents a corresponding social graph node on the social graph where a subset of events of the plurality of events having a particular type occur and each of the DAG edges of the DAG represents a propagation of each event of the subset of events of the particular type from a first social graph node to a second social graph node, and assessing a confidence level that the plurality of events are online attack events;
   performing a cluster analysis comprising analysis of pairs of the plurality of events that have been graphed on the DAG as having been propagated, wherein the cluster analysis is repeated for each type of the plurality of events and one or more timings of the plurality of events; and
   providing an updated confidence level associated with the plurality of events being the online attack events based on the cluster analysis,
   wherein an identity of an online attacker associated with the online attack events is further associated with the social graph.

2. The method of claim 1, wherein the propagation of each event of the subset of events of the particular type from the first social graph node to the second social graph node is based on each event of the subset of events of the particular type occurring at a time T1 at the first social graph node, each event of the subset of events of the particular type occurring at a time T2 at the second social graph node, and T1 is earlier than T2.

3. The method of claim 1, wherein the propagation of each event of the subset of events of the particular type from the first social graph node to the second social graph node comprises propagation of a first event of the subset of events of the particular type occurring at the first social graph node to a second event of the subset of events of the particular type occurring at the second social graph node, and content of the first event is related to content of the second event.

4. The method of claim 1, wherein one of the plurality of events comprises a posting of information on a social network.

5. The method of claim 1, further comprising:
   determining a cluster of the at least one DAG; and
   determining a score associated with the cluster, wherein the score is based on a size of the cluster, which is a sum of a number of the DAG nodes of the at least one DAG.

6. The method of claim 1, further comprising: performing the cluster analysis concurrently on the pairs of the plurality of events that have been propagated.

7. The method of claim 1, wherein the generating the DAG comprises determining whether the plurality of events are an online attack events, determining a degree of the online attack events, and determining a direction of the online attack events.

8. At least one computing device comprising non-transitory storage and a hardware processor configured to perform:
   detecting a plurality of events based on an analysis of a data stream by identifying the plurality of events as being associated with users on a social graph, the social graph comprising a plurality of social graph nodes and social graph edges and each of the plurality of events having a type, to receive one or more indicators of an online attack;
   analyzing propagation of the plurality of events by, for each type of the plurality of events, generating at least one directed acyclic graph (DAG) comprising a plurality of DAG nodes and DAG edges, where each DAG node on the DAG represents a corresponding social graph node on the social graph where a subset of events of the plurality of events having a particular type occur and each of the DAG edges of the DAG represents a propagation of each event of the subset of events of the particular type from a first social graph node to a second social graph node, and assessing a confidence level that the plurality of events are online attack events;

performing a cluster analysis comprising analysis of pairs of the plurality of events that have been graphed on the DAG as having been propagated, wherein the cluster analysis is repeated for each type of the plurality of events and one or more timings of the plurality of events; and providing an updated confidence level associated with the plurality of events being the online attack events based on the cluster analysis, wherein an identity of an online attacker associated with the online attack events is further associated with the social graph.

9. The at least one computing device of claim 8, wherein the propagation of each event of the subset of events of the particular type from the first social graph node to the second social graph node is based on each event of the subset of events of the particular type occurring at a time T1 at the first social graph node, each event of the subset of events of the particular type occurring at a time T2 at the second social graph node, and T1 is earlier than T2.

10. The at least one computing device of claim 8, wherein the propagation of each event of the subset of events of the particular type from the first social graph node to the second social graph node comprises propagation of a first event of the subset of events of the particular type occurring at the first social graph node to a second event of the subset of events of the particular type occurring at the second social graph node, and content of the first event is related to content of the second event.

11. The at least one computing device of claim 8, further comprising:
    determining a cluster of the at least one DAG; and
    determining a score associated with the cluster.

12. The at least one computing device of claim 11, wherein the score is based on a size of the cluster, which is a sum of a number of the DAG nodes of the at least one DAG.

13. A non-transitory computer readable medium having stored therein computer executable instructions for:
    (a) detecting an event of a plurality of events that is associated with a first user, each of the plurality of events having a type;
    (b) determining that the first user is associated with a first social graph node on a social graph;
    (c) adding a directed acyclic graph (DAG) node to a DAG corresponding to the first social graph node on the social graph;
    (d) assigning the DAG node on the DAG as a current node;
    (e) determining that the event occurs at a time T1;
    (f) identifying at least one or more second users associated with at least one second social graph node adjacent to the first social graph node on the social graph corresponding with the current node;
    (g) determining if the one or more second users are associated with an occurrence of another event having a same type as the event associated with the first user and for each of the determined one or more second users:
        (g1) adding a second DAG node to the DAG corresponding to the at least one second social graph node on the social graph, the added second DAG node being considered as one new node;
        (g2) determining that the another event having the same type as the event associated with the first user occurs at a time T2; and
        (g3) adding a directed edge between the current node and the one new node to indicate propagation of the another event with the directed edge pointing to the current node if T1 is later than T2 or pointing to the one new node if T2 is later than T1;
    (h) storing the DAG;
    (i) assessing a confidence level that the plurality of events are online attack events based on the DAG;
    (j) performing a cluster analysis comprising analysis of pairs of the plurality of events that have been graphed on the DAG as having been propagated, wherein the cluster analysis is repeated for each type of the plurality of events and one or more timings of the plurality of events; and
    (k) providing an updated confidence level associated with the plurality of events being the online attack events based on the cluster analysis.

14. The computer readable medium of claim 13, further comprising:
    for the one new node:
    assigning the one new node as the current node;
    assigning a current value of T2 associated with the one new node as a new value of T1, and setting a new value of T2; and
    repeating the operations (f), (g), (g1), (g2), and (g3);
    wherein each of the operations (f), (g), (g1), (g2), and (g3) is terminated when a stopping condition is reached.

15. The computer readable medium of claim 13, wherein the event associated with the first user comprises a posting of information on a social network.

16. The computer readable medium of claim 13, wherein content of the another event is related to content of the event associated with the first user.

17. The computer readable medium of claim 13, further comprising determining a score based on a size of the DAG.

18. The computer readable medium of claim 13, further comprising determining a score based on comparing at least one aspect of the DAG with the at least one aspect of at least one other DAG.

* * * * *